United States Patent
Boreman et al.

(10) Patent No.: US 6,310,346 B1
(45) Date of Patent: *Oct. 30, 2001

(54) WAVELENGTH-TUNABLE COUPLED ANTENNA UNCOOLED INFRARED (IR) SENSOR

(75) Inventors: Glenn D. Boreman, Geneva; Iulian Cordreanu, Orlando; Christophe Fumeaux, Orlando; Michael Gritz, Orlando; Christos Christodoulou, Orlando, all of FL (US)

(73) Assignee: University of Central Florida, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/340,850

(22) Filed: Jun. 28, 1999

Related U.S. Application Data

(63) Continuation-in-part of application No. 09/004,132, filed on Jan. 7, 1998, now Pat. No. 6,037,590.
(60) Provisional application No. 60/048,334, filed on May 30, 1997.

(51) Int. Cl.[7] .................................. G01J 5/20; G01J 5/34
(52) U.S. Cl. ...................................... 250/338.4; 250/338.1
(58) Field of Search .............................. 250/338.1, 338.3, 250/338.4, 339.01, 332, 341.3; 343/745, 700 MS

(56) References Cited

U.S. PATENT DOCUMENTS

| | | |
|---|---|---|
| Re. 30,131 | 10/1979 | Javan . |
| 4,652,885 | 3/1987 | Saffold . |
| 5,239,179 | 8/1993 | Baker . |
| 5,248,884 | 9/1993 | Brewitt-Taylor . |

(List continued on next page.)

OTHER PUBLICATIONS

UK Patent Application 2,260,218A (Published Jul. 4, 1993), Inventors: Taylor et al. Infrared.

Wilke, Nanometer Thin–Film Ni–NiO–Ni Diodes for 30 THZ Radiation, Applied Physics, 1994, p. 329–341.

(List continued on next page.)

*Primary Examiner*—Constantine Hannaher
*Assistant Examiner*—Albert Gagliardi
(74) *Attorney, Agent, or Firm*—Brian S. Steinberger; Law Offices of Brian S. Steinberger

(57) ABSTRACT

A tuned antenna-coupled infrared detector is made possible by application of a bias voltage in the range of a few hundred millivolts. The use of first and second antenna arms connected to the detector makes possible polarization tuning which eliminates the need for bulk-optical polarization filters. An alternative tuned detector is one in which the antenna is frequency tuned by a capacitative device to make the detector particularly responsive to 8 um to 12 um infrared radiation. When integrated into focal plane arrays, these detectors can be used in remote-sensing systems to facilitate enhanced image recognition, feature extraction and image-clutter removal. One preferred version of the polarization tuned antenna has longitudinal metal antenna arms extending outward from an infrared(IR) sensor in a spiral pattern, with polarization tuning devices connected between the antenna arms, and a voltage for controlling the polarization tuning devices, wherein the polarization tuning devices enable real-time control of current distribution in the arms. For the frequency tuned sensors, the embodiment is preferably a microstrip antenna coupled to a bolometer wherein the sensor has a tunable response accomplished by use of a single substrate voltage on a separate capacitative device. The infrared(IR) sensors can be tunnel diodes, schottky diodes, photovoltaics, photoconductors, bolometers and pyroelectrics. Application areas can include earth-resource mapping, pollution monitoring, and general surveillance.

10 Claims, 18 Drawing Sheets

U.S. PATENT DOCUMENTS

| | | |
|---|---|---|
| 5,404,146 | 4/1995 | Rutledge . |
| 5,432,374 | 7/1995 | Norton . |
| 5,436,453 | 7/1995 | Chang . |
| 5,442,176 | 8/1995 | Eckel . |
| 5,446,284 | 8/1995 | Butler . |
| 5,512,750 | 4/1996 | Yanka . |
| 5,519,529 | 5/1996 | Ahearn . |
| 5,523,570 | 6/1996 | Hairston . |
| 5,583,340 * | 12/1996 | Grossman ............................ 250/353 |
| 5,773,831 | 6/1998 | Brouns . |
| 5,777,581 * | 7/1998 | Lilly et al. .................... 343/700 MS |
| 5,790,080 * | 8/1998 | Apostolos ............................ 343/744 |
| 6,037,590 * | 3/2000 | Boreman et al. ................. 250/338.4 |
| 6,100,525 * | 8/2000 | Eden ................................ 250/338.1 |

OTHER PUBLICATIONS

Wire, Improved Performance of a Superconductive Optical Detector with Planar Antennas, IEEE Transactions on Applied Superconductivity, Mar. 1993, p. 2163–2166.

Goldstone, Polarization Diversity Lens, IEEE Transactions on Applied Superconductivity, Mar. 1994, p.237–239.

Haskins, Active Polarization–Agile Microstrip Patch Antennas, *Antennas and Propagation,* Apr. 1995, p. 163–165.

Forman, A Tunable Second–Resonance Cross–Slot Antenna, *IEEE,* Mar. 1997 p. 18–21.

Fumeaux, Polarization Response of Asymmetric–Spiral Infrared Antennas, *Optical Society of America,* Sep. 1997, p. 6485–6490.

* cited by examiner

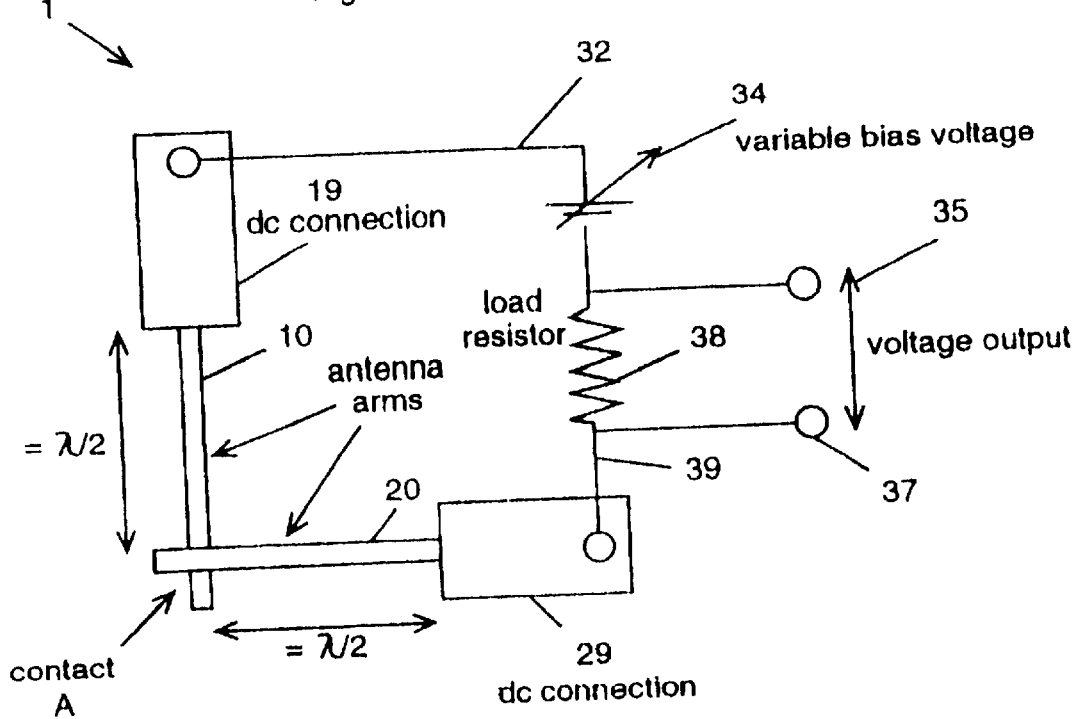

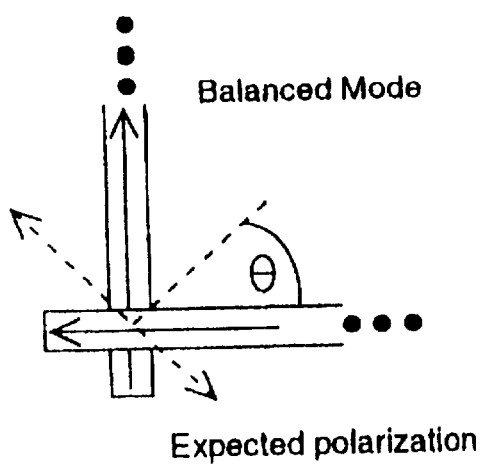
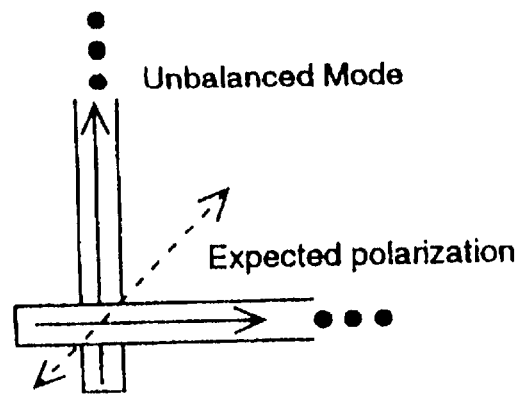
Fig. 2A
Fig. 2B

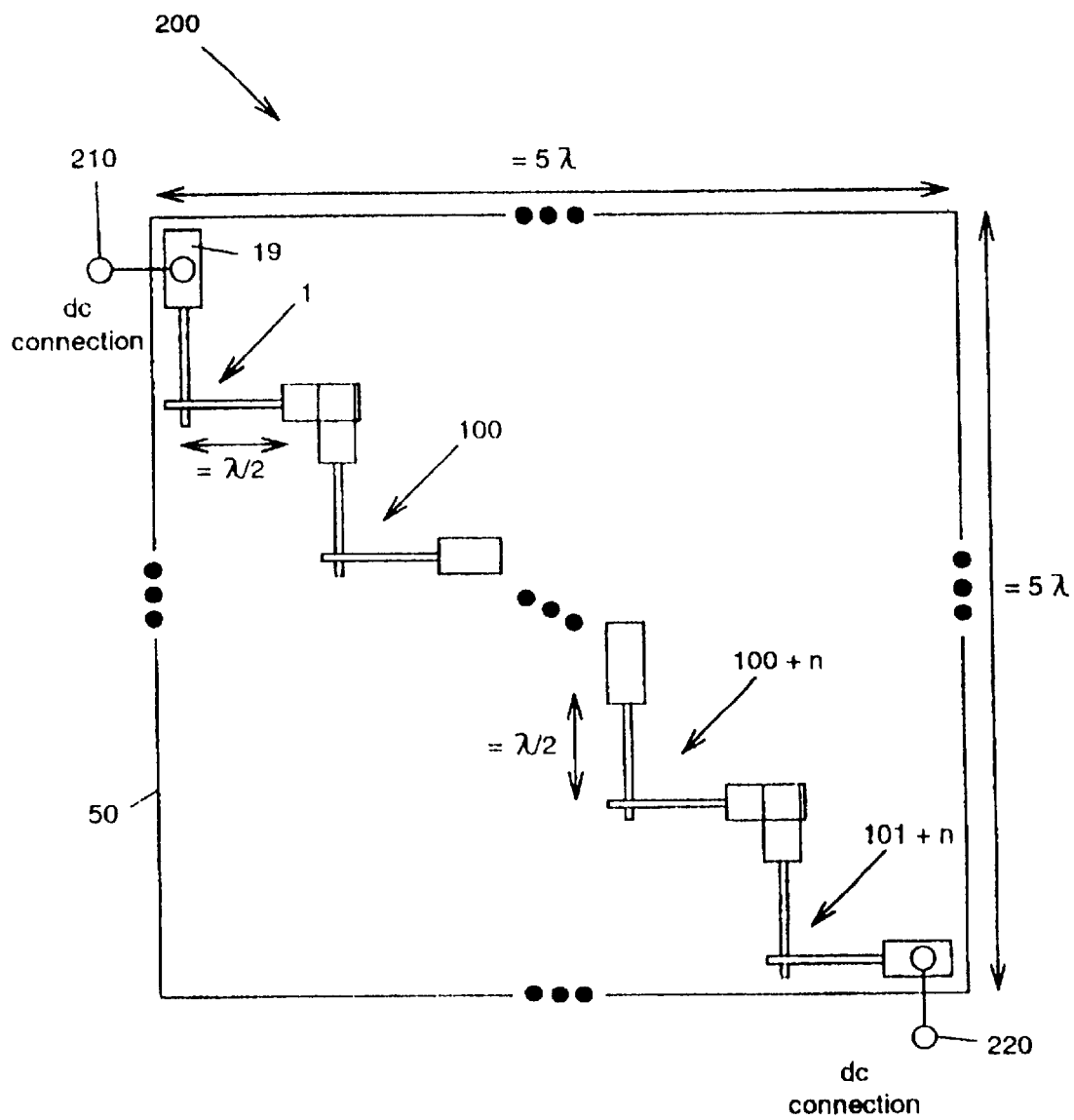

WAVELENGTH-TUNABLE COUPLED ANTENNA UNCOOLED INFRARED (IR) SENSOR

This invention relates to infrared detectors, and in particular to an antenna, which includes a device coupled directly to the antenna feed which allows tuning of the collected infrared radiation onto an infrared detector sensor, and is a Continuation-In-Part of U.S. Application Ser. No. 09/004,132 entitled: Polarization-Tunable Antenna-Coupled Infrared Detector, filed on Jan. 7, 1998 now U.S. Pat. No. 6,037,590 issued on Mar. 14, 2000, which claims the benefit of priority to U.S. Provisional Application No. 60/048,334 filed May 30, 1997.

BACKGROUND AND PRIOR ART

Infrared(IR) systems have been widely used in the past. Current systems generally require bulk optical systems having multiple moving parts for polarization control. Image forming radiation is typically collected for a fixed polarization state. Optical filters must be used in the optical train before the receiving detector array. The selection of the polarization state requires mechanical motion of the optical filters. The typical weight of the necessary filter and switching assemblies is on the order of 1 kg or more. The required time to switch between polarization states can be on the order of 2 seconds or more. Polarization-resolved imagery is largely unexploited, because of inconvenient implementation.

Many U.S. Patents have been proposed for Infrared detectors but have many of the problems previously described. See for example U.S. Patents: U.S. Pat. No. Re. 30,131 to Javan; U.S. Pat. No. 4,652,885 to Saffold et al.; U.S. Pat. No. 5,239,179 to Baker; U.S. Pat. No. 5,248,884 to Brewitt-Taylor et al.; U.S. Pat. No. 5,404,146 to Rutledge; U.S. Pat. No. 5,432,374 to Norton; U.S. Pat. No. 5,436,453 to Chang et al.; U.S. Pat. No. 5,442,176 to Eckel, Jr. et al.; U.S. Pat. No. 5,446,284 to Butler et al.; U.S. Pat. No. 5,512,750 to Yanka et al.; U.S. Pat. No. 5,519,529 to Ahearn et al.; and U.S. Pat. No. 5,523,570 to Hairston.

SUMMARY OF THE INVENTION

The first objective of the present invention is to provide an Infrared(IR) detector antenna system for collecting image-forming radiation by means of a tuned state.

The second object of this invention is to provide an IR detector antenna system of collecting radiation in a dynamically programmable tuned state.

The third object of this invention is to provide an IR detector antenna system where optical filters are eliminated and polarization selection is integrated directly onto the detector array.

The fourth object of this invention is to provide an IR detector antenna system where the control and selection of the tunable state is completely electronic and requires no moving parts.

The fifth object of this invention is to provide an IR detector antenna system where the weight required for implementation is essentially zero.

The sixth object of this invention is to provide an IR detector antenna system where the time required to switch polarization is compatible with video frame rates on the order of approximately 3/1000 of a second.

The seventh object of this invention is to provide an IR detector antenna system where the polarization state for reception can be tailored to features of interest in the image data.

The eighth object of this invention is to provide an IR detector antenna system which enables the development of improved algorithms for both image-recognition and for discrimination against image clutter.

In the polarization tuned embodiment of the subject invention, infrared antennas are integrated into existing Infrared(IR) focal-plane-array (FPA) systems. The arrangement is an array of independent antenna-coupled detectors, rather than a phased-array antenna. Each novel detector pixel square can have exterior dimensions of between approximately 40 micrometers to approximately 50 micrometers on each side. The size of the array can be approximately 5 to approximately 20 mm across each side. One possible embodiment of an individual pixel (unit cell) includes a series connection of individual antenna-coupled infrared sensors distributed over the unit cell.

The polarization tuning is accomplished by the fact that the relative phase of the current waves on the arms of each antenna is determined by the capacitance of the load impedance located at the feed.

The frequency tuning embodiment of the invention relies on the electrical size of the antenna (how large is the antenna in terms of the wave-length of the radiation to be sensed) which is modified by external means whereby its resonant frequency is changed.

The capacitance of the IR sensing diode used at the feed is a function of the externally applied voltage imposed on the antenna.

The polarization response of the sensor can thus be controlled electronically, eliminating the need for separate optical filters.

For the frequency tuned sensors, this embodiment is preferably a microstrip antenna coupled to a bolometer wherein the sensor has a tunable response accomplished by use of a single substrate voltage on a separate capacitative device such as a MOS(Metal Oxide Semiconductor).

These detectors and their arrays can be used in remote-sensing systems to facilitate enhanced image recognition, feature extraction, and image-clutter removal. The application areas can include earth-resource mapping, pollution monitoring and general surveillance.

Further objects and advantages of this invention will be apparent from the following detailed description of the two preferred embodiments which are illustrated schematically in the accompanying drawings.

BRIEF DESCRIPTION OF THE FIGURES

FIG. 1A is a top view of a single antenna-coupled sensor. It is one sub-unit of the pixel. Pixels (FIG. 3) are arranged into focal-plane arrays (FIG. 4).

FIG. 2A shows the foundation of the polarization switching behavior for a balanced mode in the Antenna-coupled sensor of FIGS. 1A–1B.

FIG. 2B shows the foundation of the polarization switching behavior of the subject invention for an unbalanced mode in the antenna-coupled sensor of FIGS. 1A–1B.

FIG. 3 a single pixel of the focal plane array shown in FIG. 4 and is composed of a series connection of individual antenna-coupled sensors shown in FIG. 1.

DETAILED DESCRIPTION

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

First Preferred Embodiment

Figure 1B:
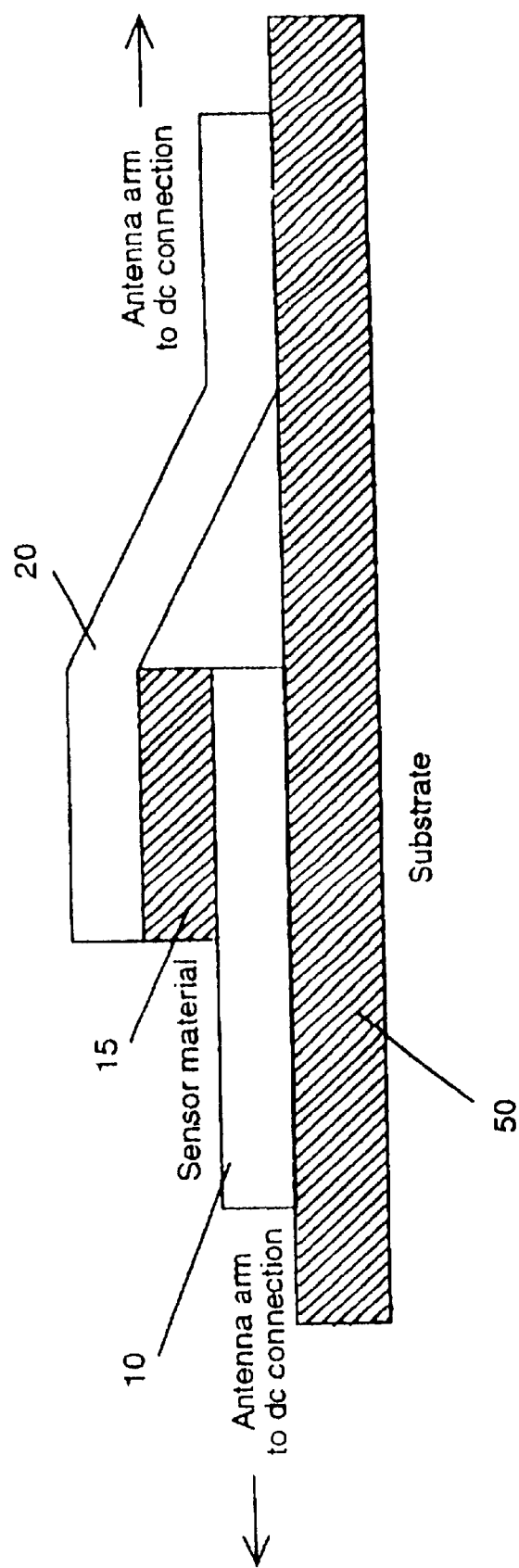
FIG. 1B is an enlarged side view of the contact region between the first and second antenna arms of FIG. 1A, along arrow A.
Figure 4:
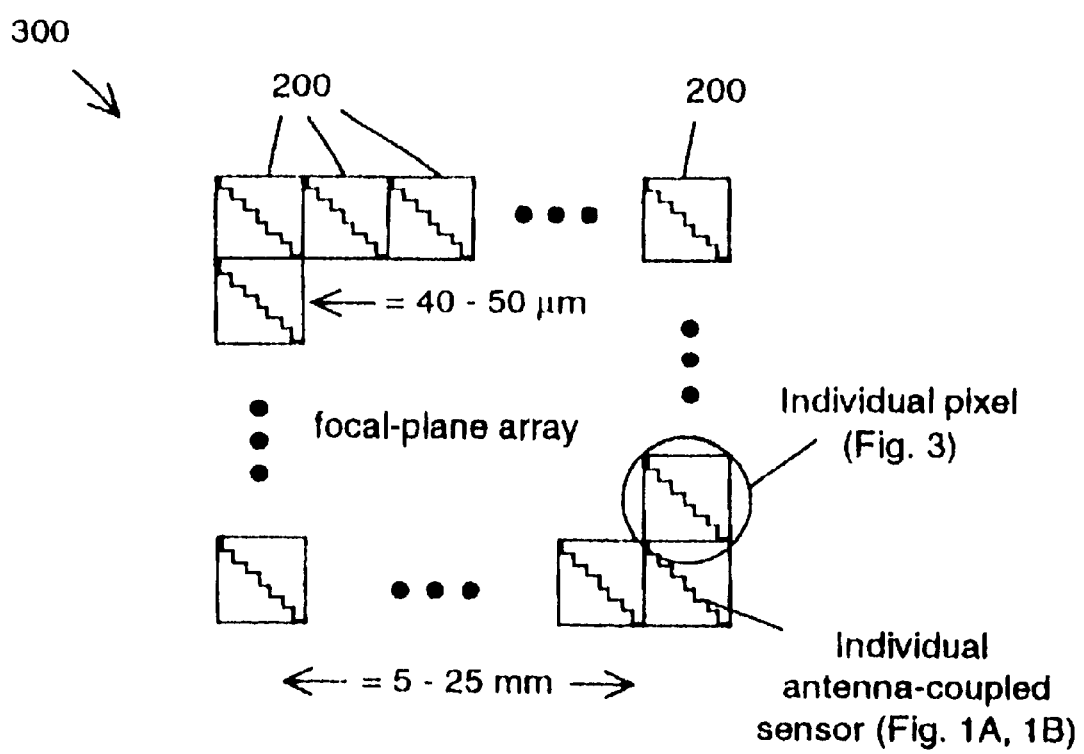
FIG. 4 is a focal plane array, composed of a matrix of individual pixels, each consisting of a series connection of antenna coupled sensors.

FIG. 1A is a top view of a single antenna-coupled sensor 1. It is one sub-unit of the pixel. Pixels (FIG. 3) are arranged into focal-plane arrays (FIG. 4). FIG. 1B is an enlarged side view of the contact region between the first and second antenna arms of FIG. 1A, along arrow A. Referring to FIGS. 1A–1B, the individual wires 10, 20 of the antenna 1 are made of metal (such as but not limited to aluminum, gold, nickel, etc.). The wires 10, 20 have a length approximately equal to one half of the wavelength of the radiation incident on the antenna 1.

Referring to FIGS. 1A–1B, antenna 1 is lithographically fabricated on top of a transparent substrate material 50 such as silicon. Antenna 1 is generally illuminated through the dielectric substrate 50, then the relevant wavelength (as far as the length of the arms is concerned) is the wavelength of the radiation inside the substrate 50. This is the free-space wavelength of 10 micrometers (infrared) and for example, in a silicon substrate the substrate wavelength is around 3 micrometers.

Referring to FIGS. 1A–1B, the incident electromagnetic radiation will induce infrared-frequency (on the order of 30 THz) current waves to flow in the arms 10, 20 of the antenna 1, along the direction of the incident electric field(the electric field of incident radiation has an arbitrary in-plane orientation.). The induced current waves will propagate along the antenna wires 10, 20, producing an infrared-frequency voltage across the sensor material. This is the mechanism for capturing the incident radiation. Sensor material 15 can include but is not limited to tunnel diodes such as NiO and AlO. Sensor material 15 can further include schottky diodes such as but not limited to PtSi, NiSi, and IrSi. Sensor material 15 can further include photovoltaic materials such as but not limited to Si, LnSb, and HgCdTe. Sensor material 15 can further include photoconductive materials such as but not limited to PbSe, PbS, Si, InSb, and HgCdTe. Sensor material 15 can further include pyroelectric materials such as but not limited to $LiTaO_3$. Antenna arms 10 and 20 can be metal wires with a small in-plane width compared to the wavelength of the incident radiation (See FIG. 5, i.e. approximately 2 micrometers).

Referring to FIGS. 1A–1B, the infrared sensor material 15 constitutes a load impedance of nominally 100 ohms across the contact region of the antenna 1, seen in the side view of FIG. 1B. For diode sensors, the current waves are rectified by the nonlinear current-voltage characteristic (FIG. 5), causing a change in the dc resistance. This dc resistance is read out by means of a voltage bridge circuit 35, 37 having a value of approximately +/− approximately 100 millivolts across a load resistor 38 of approximately 100 ohms between the dc connection 29 and variable bias voltage 34 of +/− approximately 200 millivolts in antenna 1. Lines 32 and 39 connect antennas 19, 29 to the bridge circuit. Other types of infrared sensor materials can also be used in the configuration of FIGS. 1A–1B. For example, bolometric sensors will dissipate the current waves, causing a temperature rise in the bolometer, and a change in the dc resistance.

The polarization-tuning mechanism arises because the impedance presented to the antenna 1 is not a pure resistance. Particularly in the case of diode sensors, the impedance has an inherent capacitive component caused by the semiconductor junctions inherent in the construction of the diode. These junctions have a capacitance that is a function of the applied voltage. This voltage is supplied across the dc connections 19, 29 of the antenna 1.

The ability to change the capacitance of the sensor by changing the externally applied bias voltage is the key to tuning the polarization of the antenna-coupled sensor. Referring to FIGS. 1A–1B, antenna arms 10 and 20 constitute a transmission line. In any such structure, the load impedance will determine the phase relationship between the current waves that can be excited on the line.

FIG. 2A shows the foundation of the polarization switching behavior for a balanced mode. FIG. 2B shows the foundation of the polarization switching behavior of the subject invention for an unbalanced mode. These two modes have a different polarization signature, shown as the dotted line. The mixing between these two modes and the resulting net polarization state of the IR sensor is determined by capacitance of the contact A, which is dependent on the bias voltage applied across the dc contacts 19, 29. FIGS. 2A–2B, considers only the two primary current-wave modes that propagate on the antenna arms 10, 20. When the current waves are 180 degrees out of phase at the contact A, this is called a balanced mode. The situation when the current waves are in-phase at the contact is called an unbalanced mode. These two modes of FIGS. 2A, 2B have a polarization response that is 90 degrees apart. Any phase between the current waves that is not zero or 180 degrees can be expressed as a sum of these two modes. The polarization response for these intermediate conditions can be similarly expressed as a sum of the two polarization states. The angle of the polarization response, seen as the vector sum of the directions of the two current waves, will depend on the mixture of the two modes. It has been demonstrated previously in published research by one of the subject inventors that the polarization response of an infrared antenna 1 depends on this phase relationship. See "Polarization response of asymmetric-spiral infrared antennas," Applied Optics, Vol. 36, pp 6485–6490 (Sep. 1, 1997). The phase difference is determined by the capacitance of the contact impedance, which can be controlled by the external bias voltage. Thus the external bias voltage controls the mode mixture and hence the polarization response of the sensor.

FIG. 3 is a single pixel 200 of the focal plane array shown in FIG. 4 and is composed of a series connection of individual antenna-coupled sensors 1 shown in FIG. 1 and other individual antenna-coupled sensors 100 to (100+n), and (101+n). These individual sensors are electrically connected in series to constitute one pixel 200. Such a series connection will allow an external bias voltage to be applied at nodes 210, 220 across all sensor elements 1, 100 to (100+n), and (101+n) simultaneously, controlling the polarization response of all sensors elements. Because the sensors are subwavelength in dimension, the series connection will also provide an enhanced collection efficiency, compared to one sensor 1 alone. The signals from each sensor 1, 100 to (100+n), and (101+n) in the pixel 200 will also add in this configuration, providing an increased signal level (proportional to the number of elements in series) compared to a single sensor 1. Component 50 refers to the substrate such as but not limited to silicon and the like, similar to substrate 50 shown in FIG. 1A. The pixel 200 is read out as a unit, providing a measurement of the radiation that falls on the pixels as a whole. A pixel 200 will typically be a square of dimension 40 to 50 microns on one side (approximately 5 wavelengths of the incident radiation).

These pixels will be arranged in a focal plane array 300, seen in FIG. 4. The focal plane array 300 can be placed in the image plane of an optical system. The arrangement and readout of individual pixels are capable of forming resolved images of the radiation that falls on the array. A focal plane array 300 can contain a matrix of between approximately 128 to approximately 512 pixels on a side, yielding focal plane array dimensions of approximately 5 to approximately 25 millimeters on a side.

Figure 5:
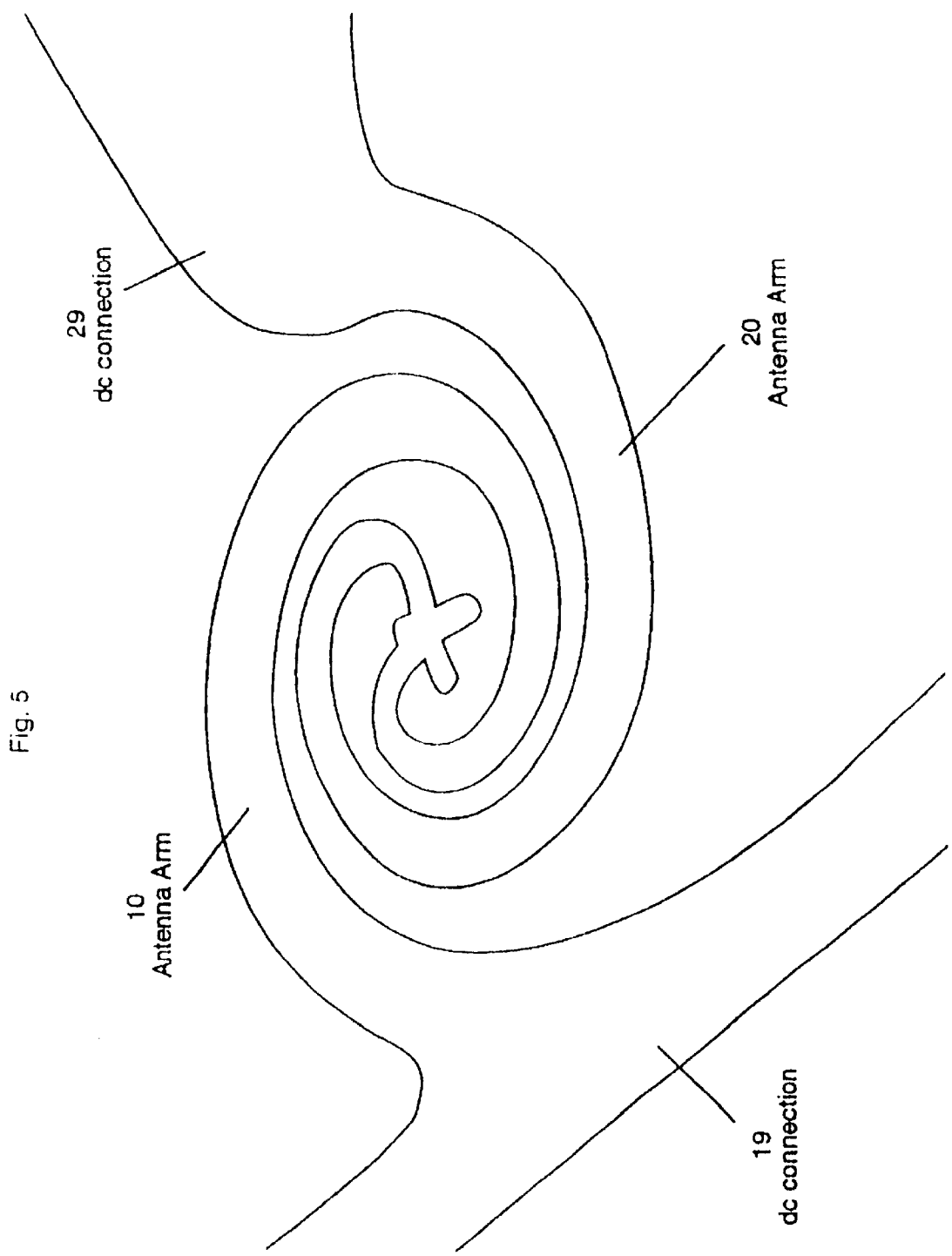
FIG. 5 is an enlarged view of an actual embodiment of the subject invention.

The subject inventors has demonstrated polarization tuning on an individual antenna-coupled infrared sensor of the type described in *Applied Optics* Vol. 36, pp 6458–6490, 1997. FIG. 5 is an enlarged magnified view of the antenna 1, wherein approximately one inch pictured is equivalent to approximately 1/30,000 of the an inch. The antenna 1 used for this demonstration was Nickel on Silicon in a spiral configuration, with the arms 10, 20 closest to the contact region intersecting at a 90 degree angle, as seen in FIG. 1A. Elements 10, 19, 20 and 29 correspond to like components described in reference to FIGS. 1A–1B. The sensor 15 (shown more clearly in FIG. 1B) was a metal-metaloxide-metal (MOM) diode, of the type described in "Nanometer thin-film Ni—NiO—Ni diodes for 30 THz radiation", *Applied Physics,* Vol. A 58, p. 329–342, 1994. The capacitance of the contact area (of dimensions approximately 0.25 micrometer on a side) is on the order of 0.1 nanofarads. It is estimated that a change in bias voltage from approximately −160 millivolts to +160 millivolts changes the capacitance of the sensor(contact A) 15 by at least a factor of two.

Figure 6:
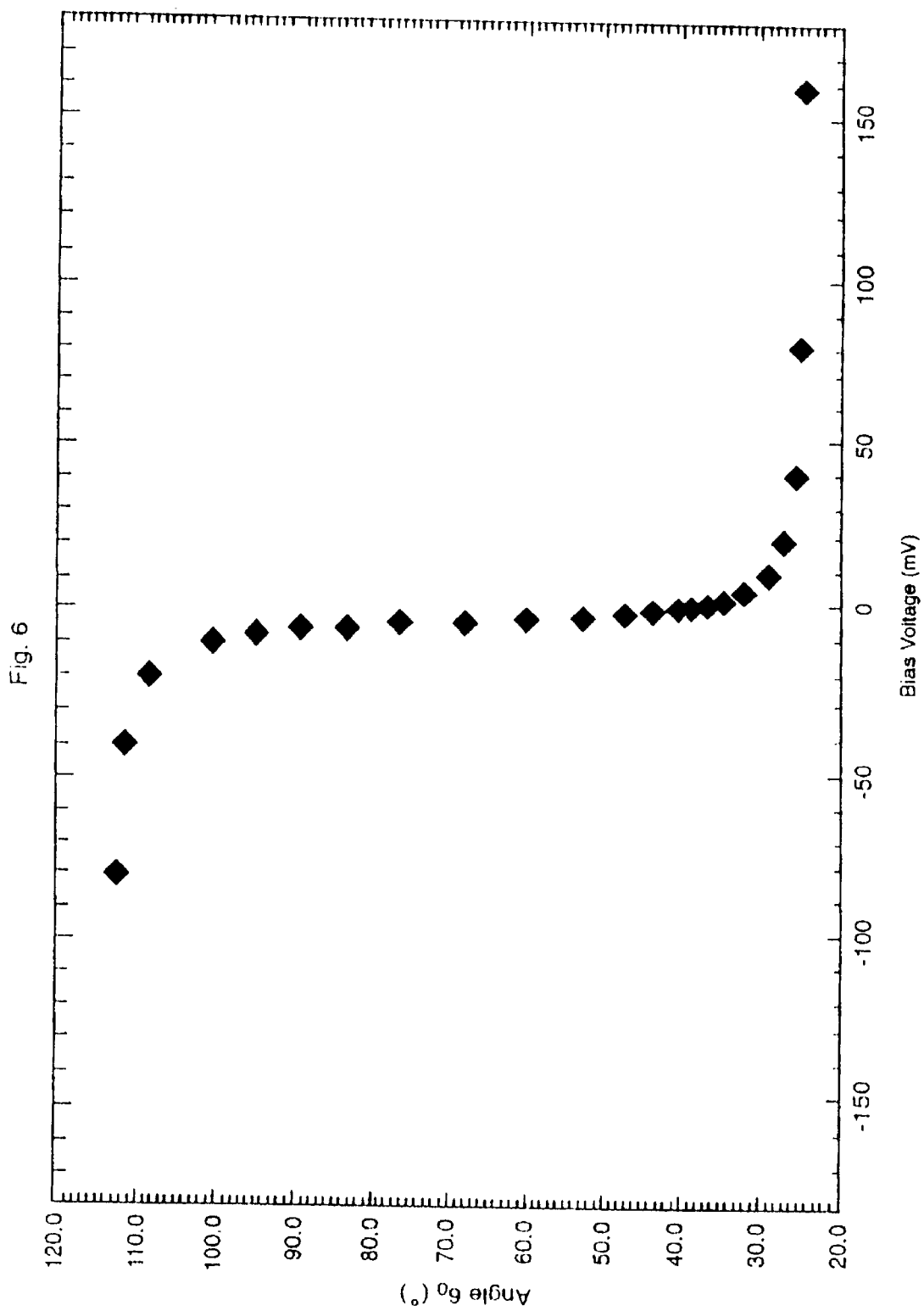
FIG. 6 is an measured plot of the demonstrated tuning of polarization angle as a function of applied bias voltage.

The polarization angle was measured using a procedure similar to that described in *Applied Optics* Vol. 36, pp 6485–6490, 1997. When the bias voltage was varied between approximately −160 millivolts to approximately +160 millivolts, the polarization angle of the detector 1 tuned continuously and repeatably from 113 degrees to 25 degrees, demonstrating a total tuning range of approximately 88 degrees. This measured polarization tuning data is shown in FIG. 6, which shows that a range of polarization tuning is possible that is sufficient to encompass both vertical and horizontal polarization. This flexibility allows for radiation reception in an selected polarization state.

The invention facilitates the development of compact, no-moving parts, imaging polarimeters. Having the polarization tuning mechanism integrated directly onto a chip will eliminate a large portion of the optical systems that are otherwise required for polarization resolved imaging.

Furthermore, the subject invention allows passive infrared sensors to have improved feature extraction, discrimination and clutter removal. The tuning accomplished by the invention is substantially faster using electrically controlled antennae than using bulk optics. One-frame-at-a time tuning allows for faster algorithms to be implemented giving more complex capabilities in real-time, such as differentiation of man-made targets from foliage.

Figure 7:
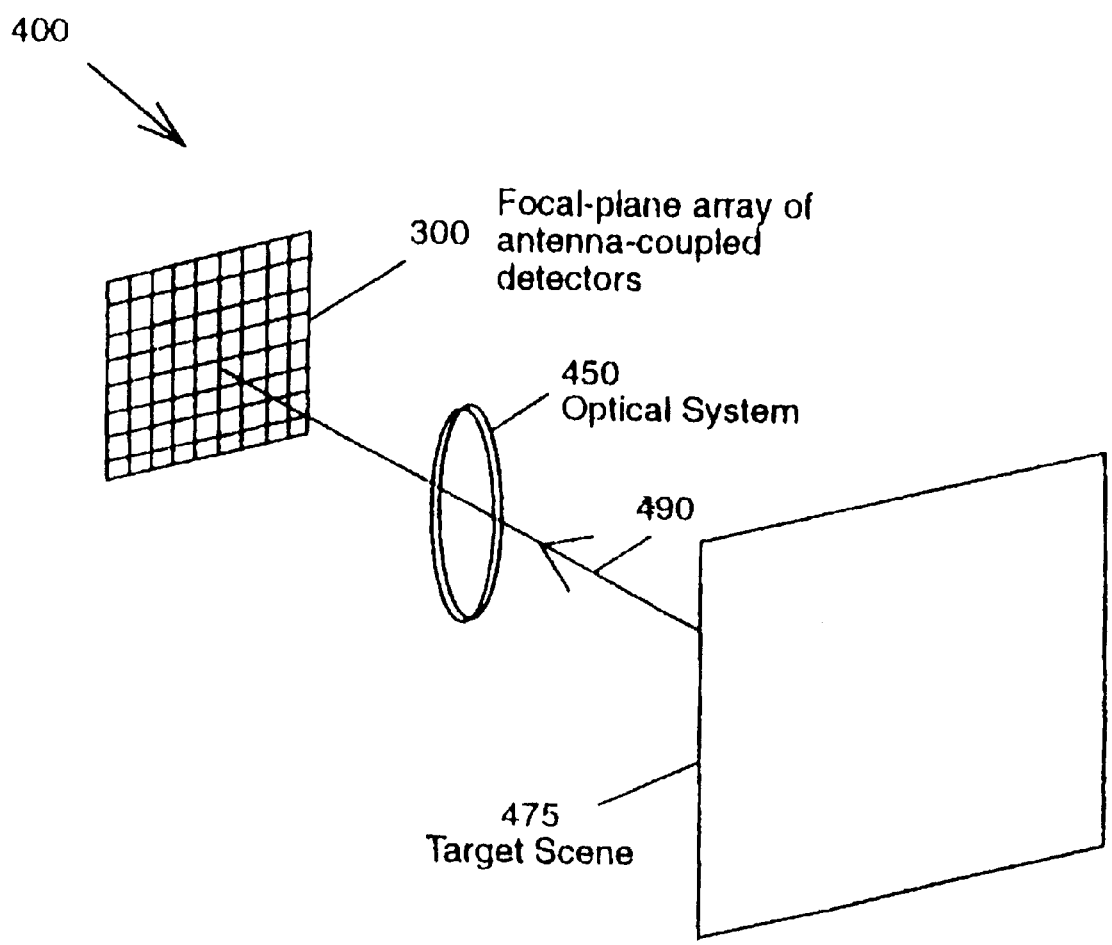
FIG. 7 shows a typical application of the subject invention.

FIG. 7 shows a typical application 400 of the subject invention where the focal-plane array of antenna-coupled detectors 300 (FIG. 4) receives radiation 490 from the field of view of a target scene 475 such as an earth surface, weaponry and the like, with a typical optical system 450 such as but not limited to an infra-red (IR) transmitting lens such as silicon and zinc selenoid. Such an application 400 can be used for remote sensing such as earth resource mapping, pollution monitoring, surveillance and the like.

Second Preferred Embodiment

In this embodiment, tuning is realized by modifying the wavelength of the antenna so it is responsive to incident radiation by a voltage-controlled capacitor. A microstrip antenna is used to couple the incident infrared radiation to a bolometer. As indicated the antenna is tuned so as to provoke a tunable response in the sensor for the approximately 8 to 12 micrometers wavelength region of the infrared. This tuning is accomplished by use of a single substrate voltage. Construction of the device uses planar technology that is compatible with standard silicon processes for electron-beam fabrication.

In this novel approach to IR detection, an antenna is used to improve their radiation collection ability with separation of this collection function from the detection function. Since the detectors are resonant structures, electronic means has been realized to alter their resonant frequency and thereby achieve frequency tunability with resultant enhanced responsivity to the incident radiation of the wavelength spectrums to be detected. The idea behind frequency tuning is to modify the electrical size of the antenna by said electronic means and thus change its resonant frequency.

Since it has been found that a narrow bandwidth antenna is required to achieve frequency tunability, a microstrip antenna has been used because of its inherent narrow bandwidth. Other characteristics that make it attractive is that the microstrip antenna has a low profile, is light weight, simple to manufacture, has low cost and easily integrated with circuits.

Figure 8A:
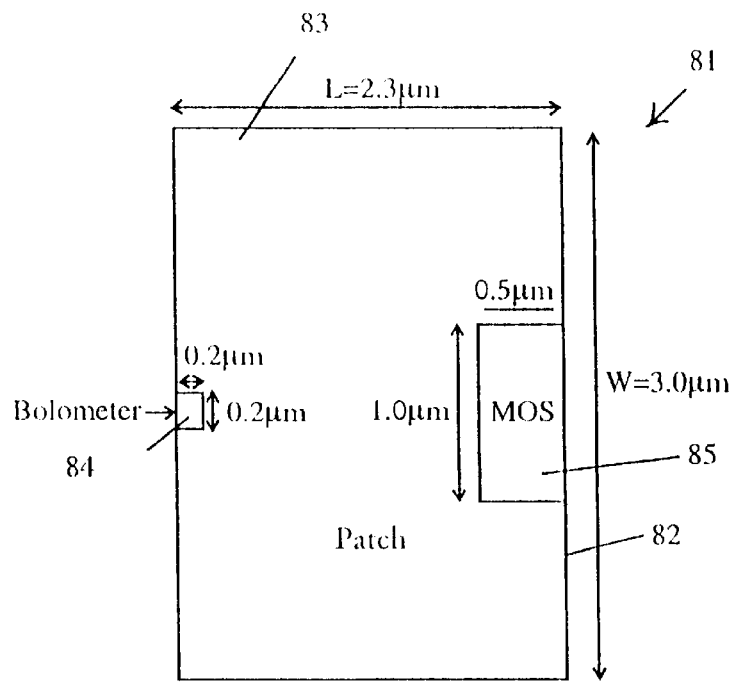
FIG. 8a shows the top view of a microstrip antenna intgrated bolometer.

A representative microstrip antenna is pictured in a top view of an IR detector in FIG. 8a where the antenna 81 of width 82 (3.0 micrometers) and length 83 (2.3 um) is integrated with the bolometer 84 separated from the MOS detector 85.

Figure 8B:
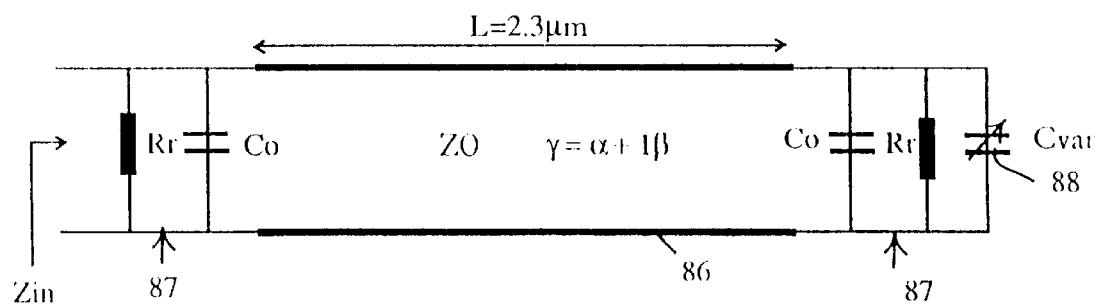
FIG. 8b illustrates the antenna of FIG. 8a as a transmission line model.

The microstrip patch antenna is electronically portrayed in FIG. 8b as a half wavelength uniform transmission line 86 imposed in an effective (consider the fringing effect) dielectric. The characteristic impedance (Z) and propagation constant (G) are determined by the antenna width, dielectric thickness and its dielectric constant. The transmission line 86 is terminated with a RC parallel combination 87 at both ends. Its electrical length can be altered by terminating it with a reactive load, e.g., a capacitor 88 increases the length while an inductor shortens the line. In our embodiment, a variable capacitor 88 is connected across the antenna open end.

Figure 9:
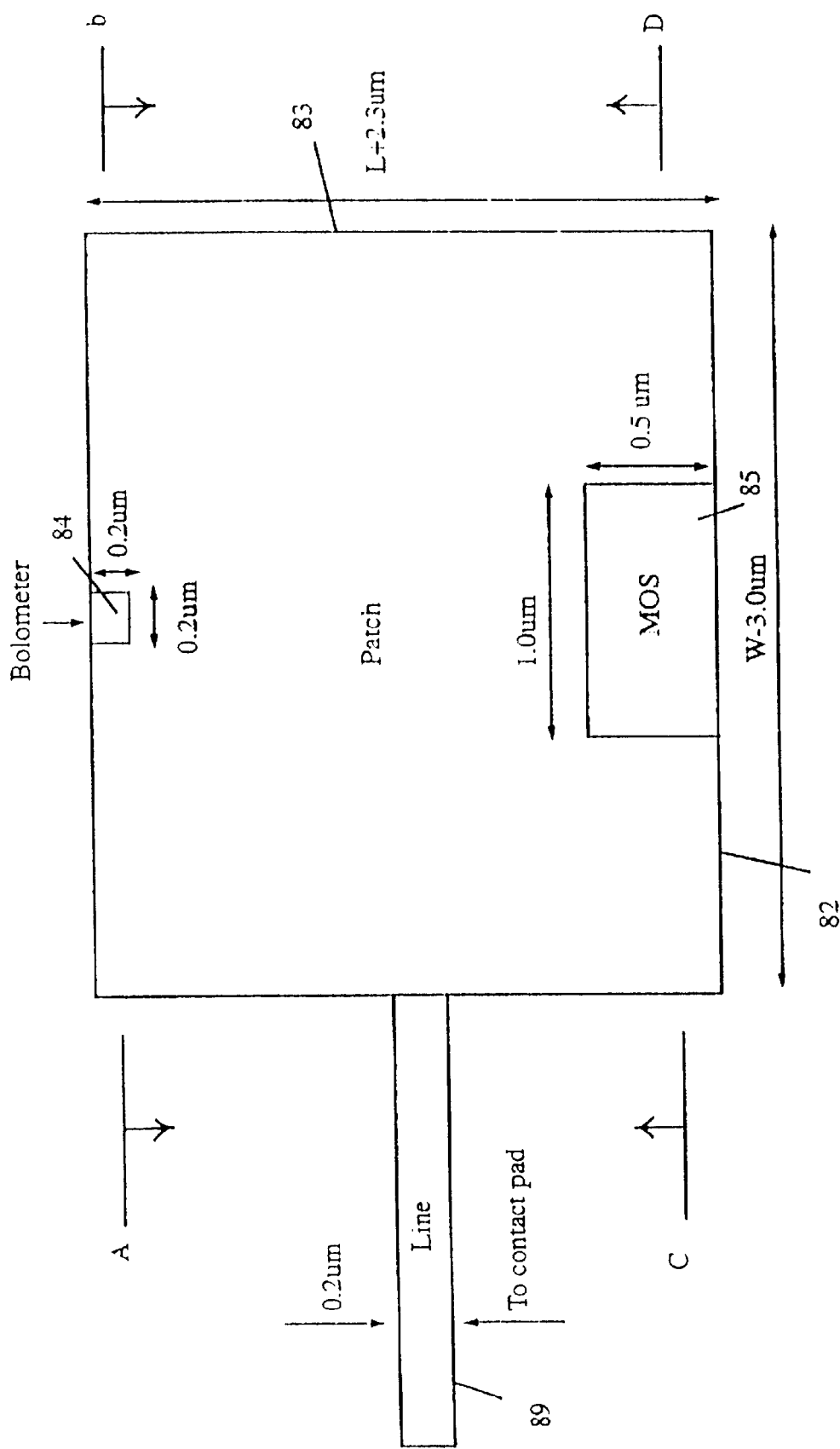
FIG. 9 the top view of an antenna intgrated bolometer.
Figure 10:
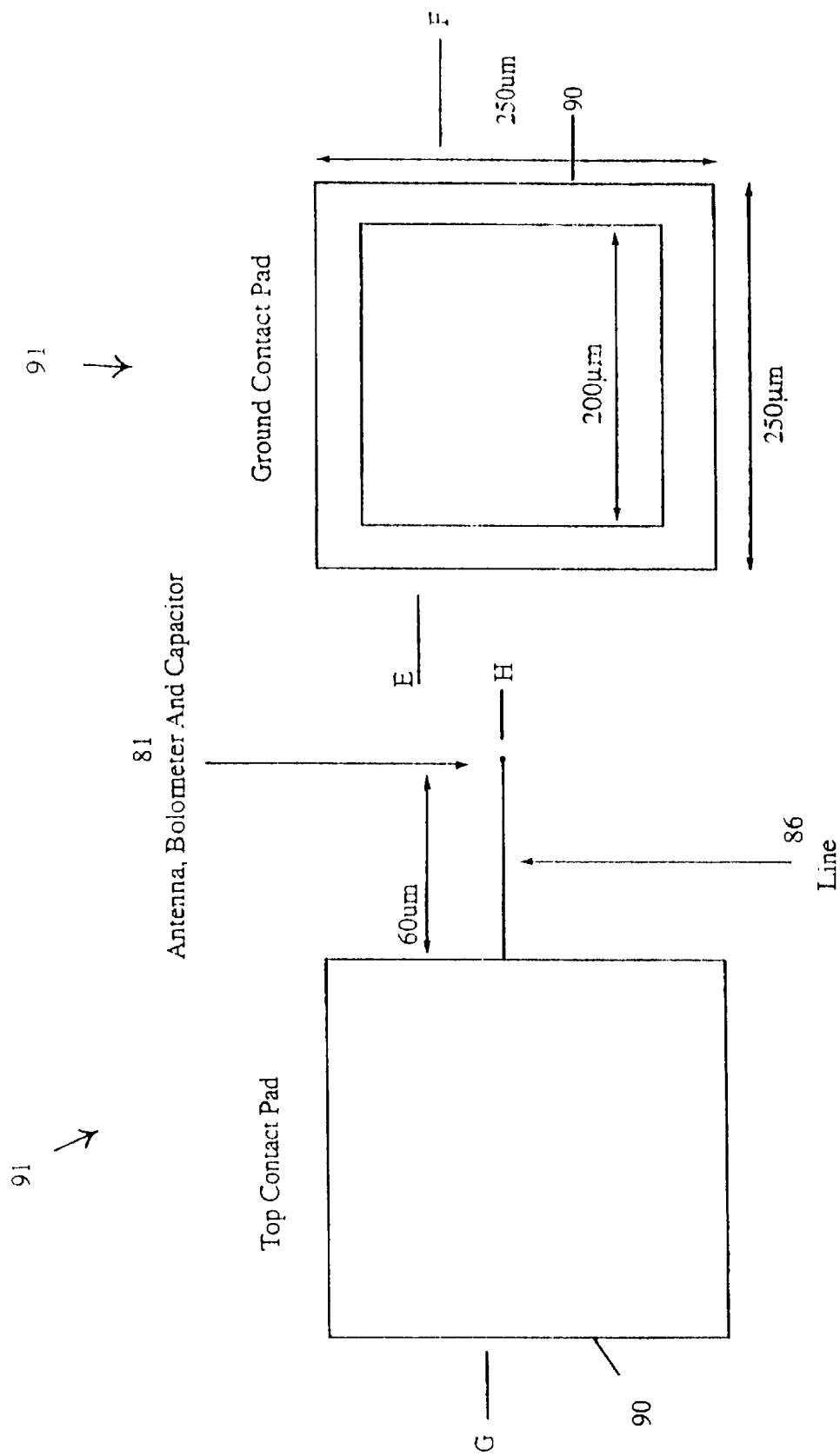
FIG. 10 illustrates a top view of the frequency tuned device.

FIG. 9 again shows in larger representation the top view of the antenna of FIG. 8a with a line 89 to the contact pad (not shown) but illustrated in FIG. 10 with width dimensions 90 of approximately 250 micrometers across each side of said contact pads 91, 93.

Figure 11:
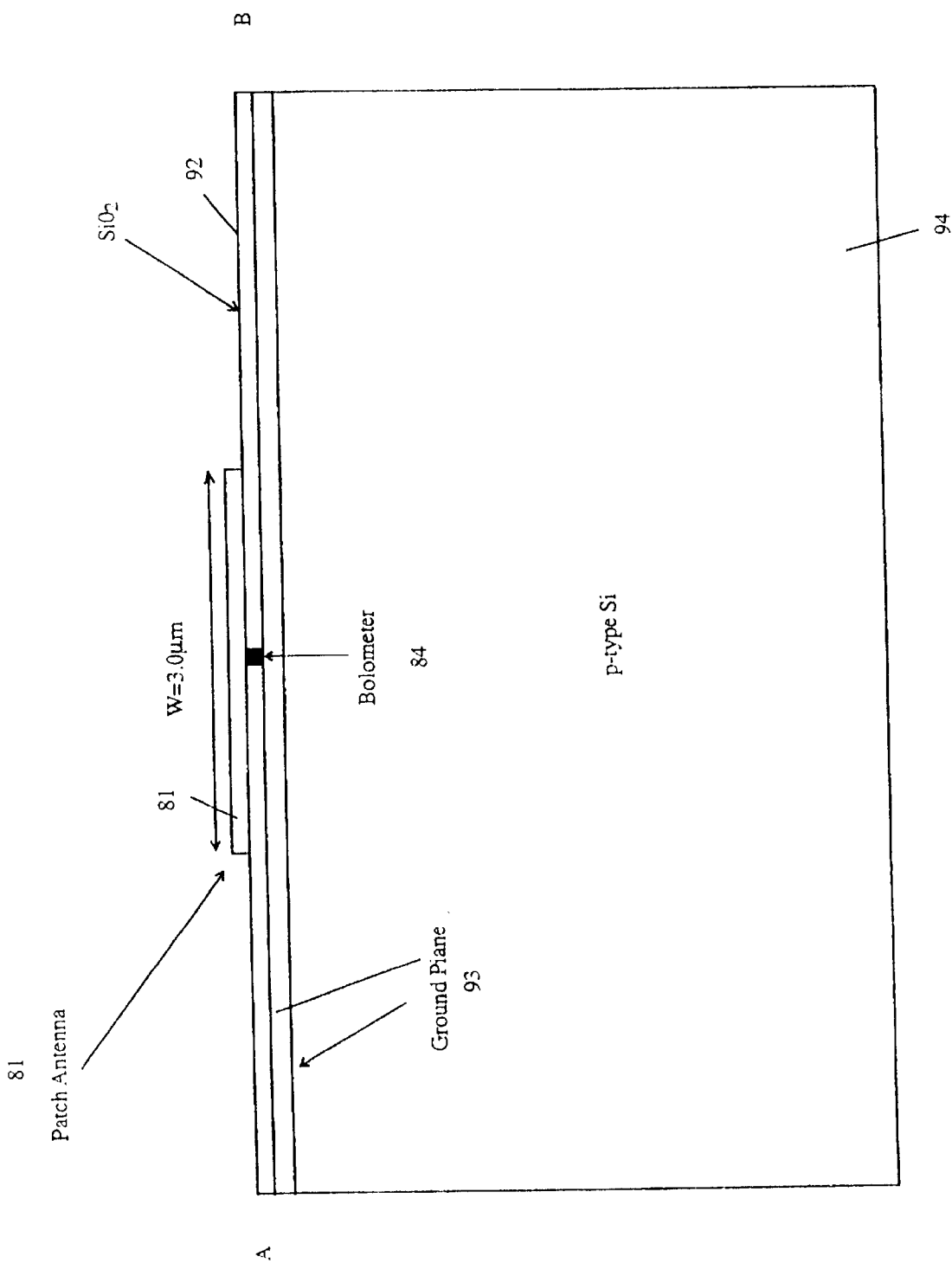
FIG. 11 shows the side view of the bolometer configuration.
Figure 12:
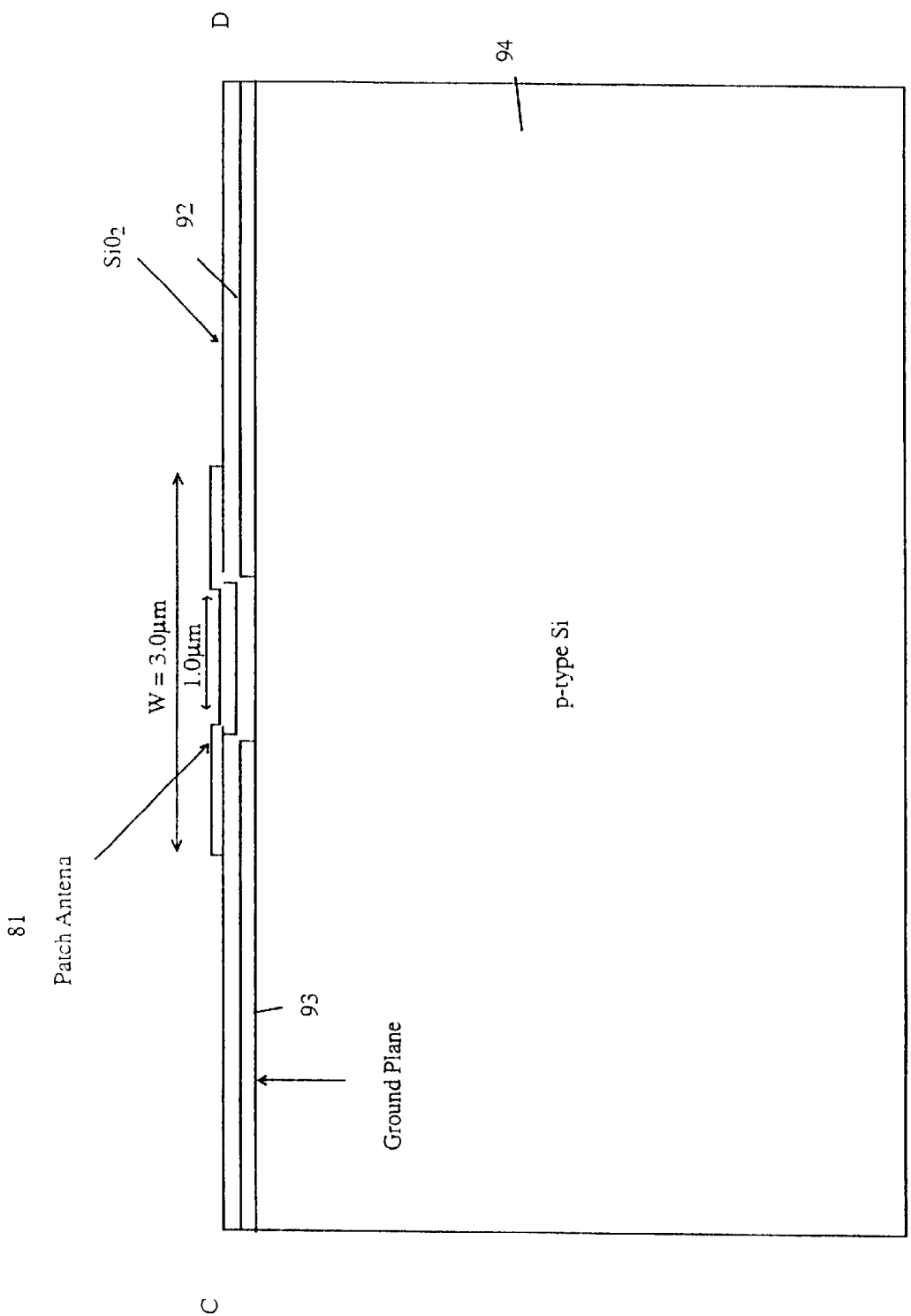
FIG. 12 shows the side view of the MOS capacitor configuration.
Figure 13:
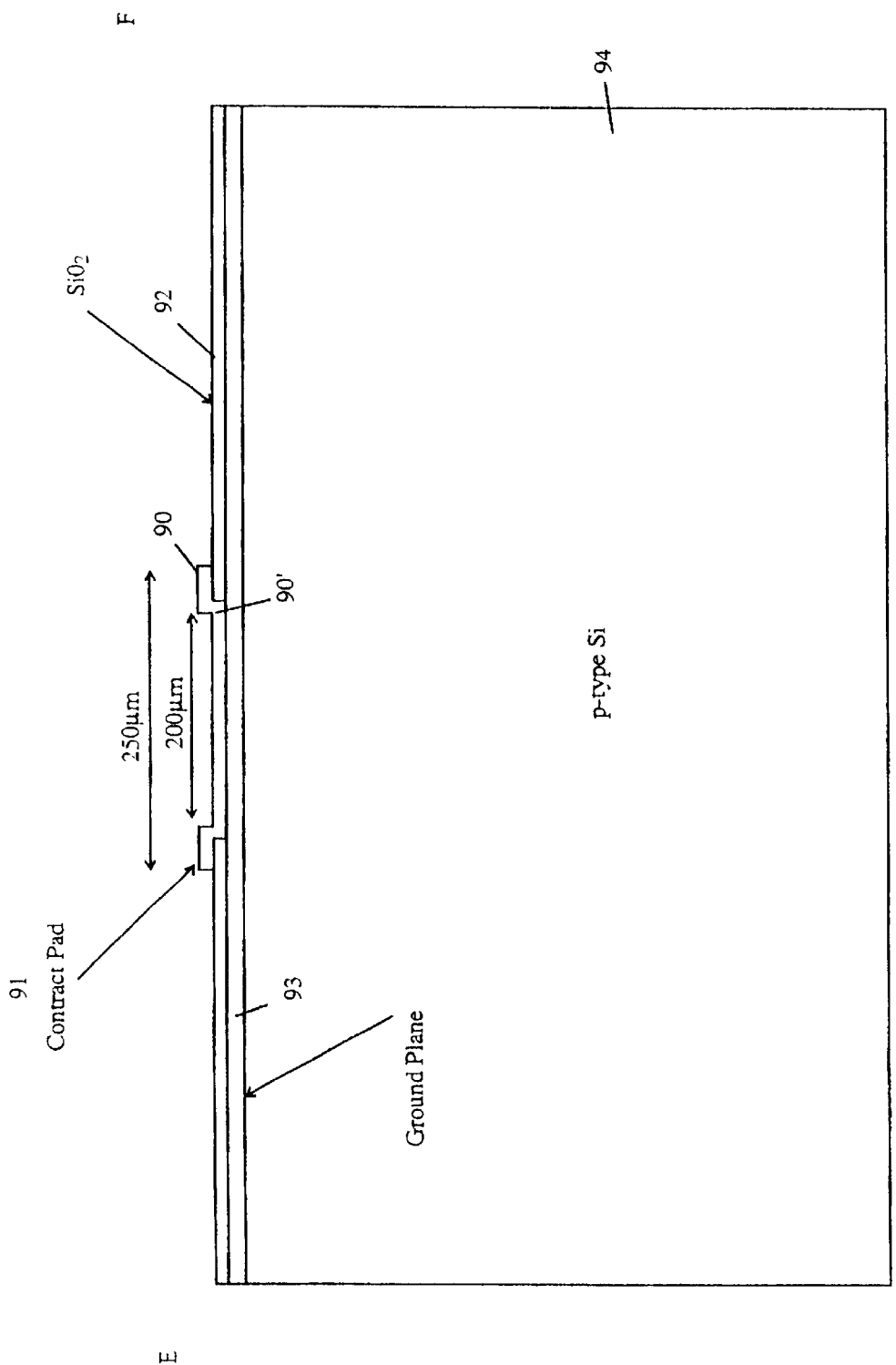
FIG. 13 shows the side view of the ground plane contact pad configuration.
Figure 14:
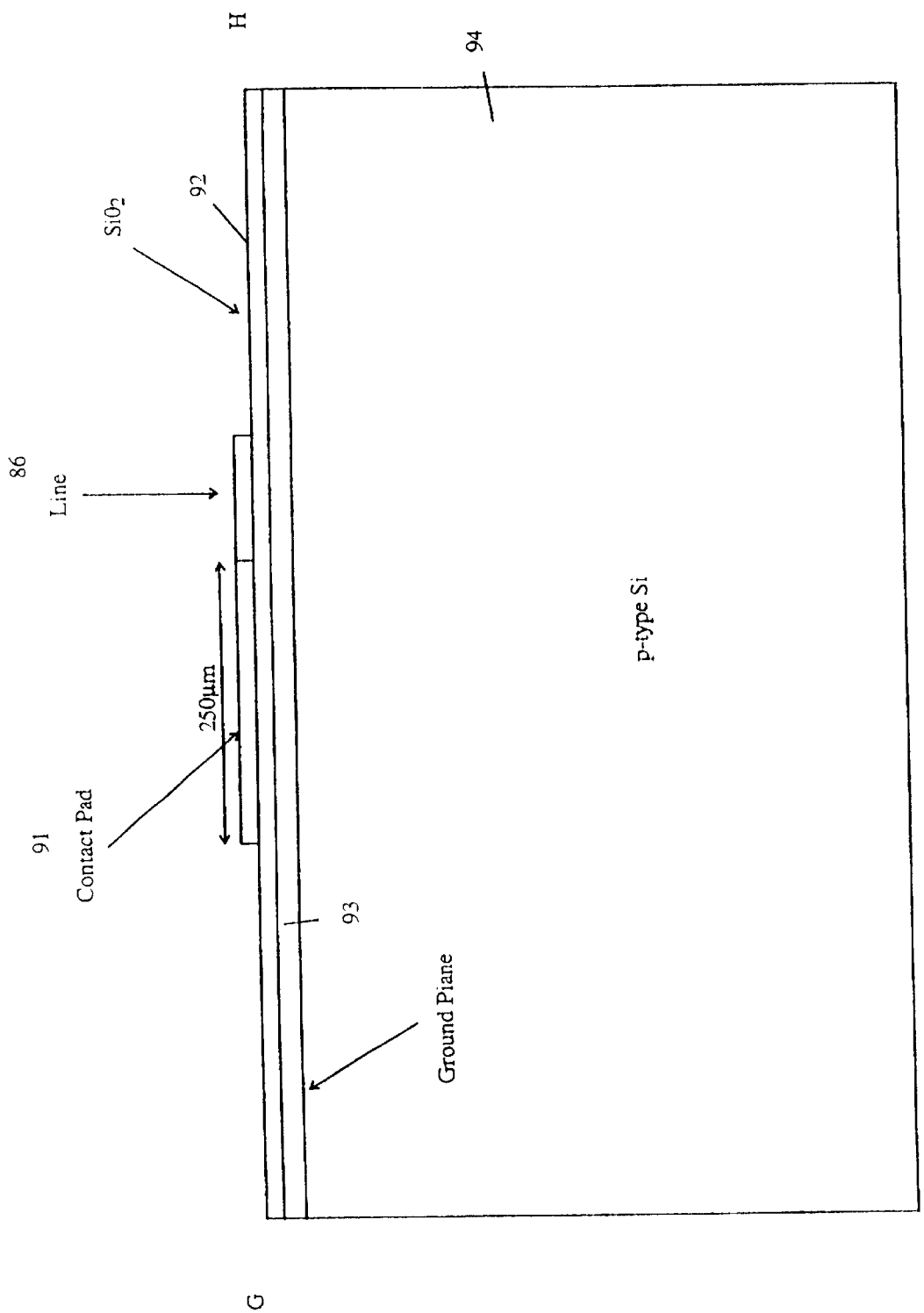
FIG. 14 shows the side view of the top contact pad configuration.
Figure 17:
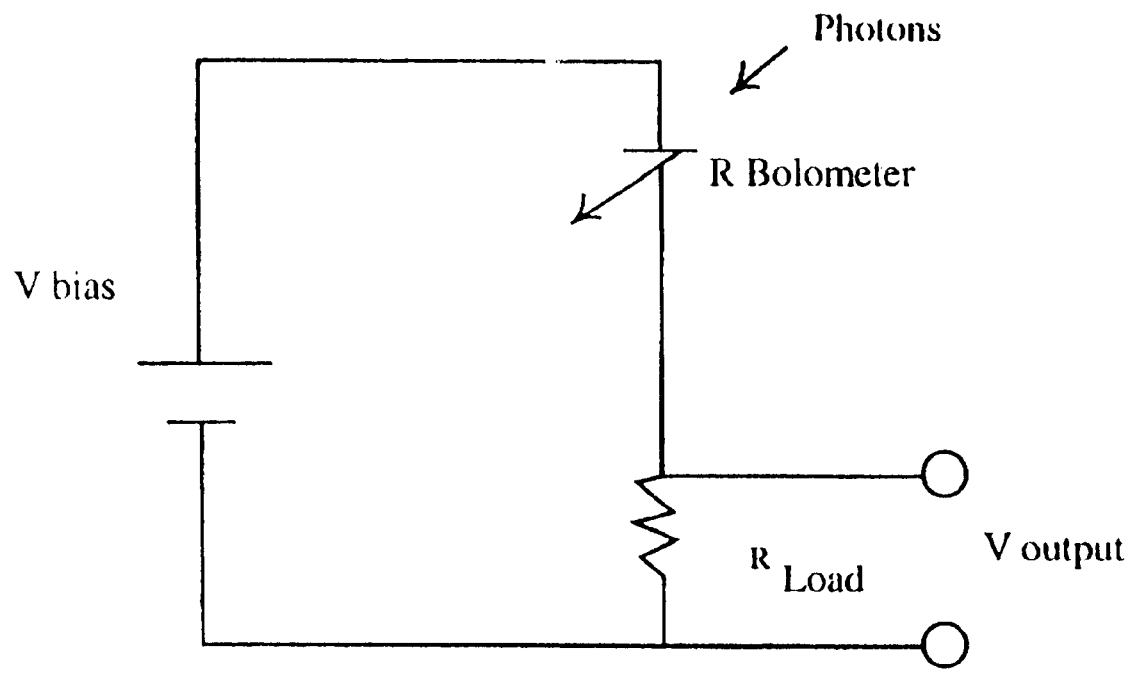
FIG. 17 shows exemplary circuit using the bolometer of the subject invention.

The physical embodiment of the frequency tunable antenna coupled IR detector is shown in the views of FIGS. 11 through 14. FIG. 11 shows a side view of the antenna coupled bolometer of FIG. 9 along arrows A, B. FIG. 12 shows the MOS (Metal Oxide Semiconductor) view of FIG. 9 along arrows C, D. FIG. 13 shows the ground plane view of FIG. 10 along arrows E, F. FIG. 14 shows the top contact view of FIG. 10 along arrow G, H. FIG. 17 shows a basic circuit using the bolometer antenna, with V bias, photons being emitted toward the bolometer, the change in resistance at the bolometer is the sensor, and a voltage output (Voutput) across a resistor (Rload) can be measured by a standard voltmeter.

Referring to FIGS. 8a and 9–14, an illustrative microstrip patch antenna 81 is aluminum having a rectangular shape with a width 82 of approximately 3.0 micrometers, a length 83 of approximately 2.3 micrometers and a thickness of approximately 0.2 micrometers and supported by a silicon substrate 92 of approximately 0.2 micrometers thickness and having a dielectric constant of approximately 3.8. The silicon substrate 92 in turn is supported by an approximately 0.2 micrometers thick ground plane 93 of aluminum disposed on a p-type silcon substrate 94 of approximately 15 mils thickness and having a resistivity of approximately 250 Ohm-cm. Now that the physical structure of the tunable IR detector has been disclosed, its fabrication begins with the deposition by electron beam of an approximately 200 NM-thick aluminum layer (the ground plane 93) onto the surface of the silicon substrate 94. A hole is then etched (electron beam lithography and reactive ion etch) into the aluminum layer for the MOS capacitor. The antenna substrate 92 of silica is deposited on the ground plane 93. The bolometer 84 and contact pad 91 windows are opened in the silica layer, a niobium layer is then deposited and the bolometer 84 is defined by electron beam lithography and liftoff. A new approximately 200 nm-thick aluminum layer is deposited, the patch antenna 81, line 89 and contact pads 91 are defined by electron beam lithography and liftoff and finally an approximately 1,000 nm-thick aluminum is deposited after which thick contact pads 91 are defined.

Figure 15:
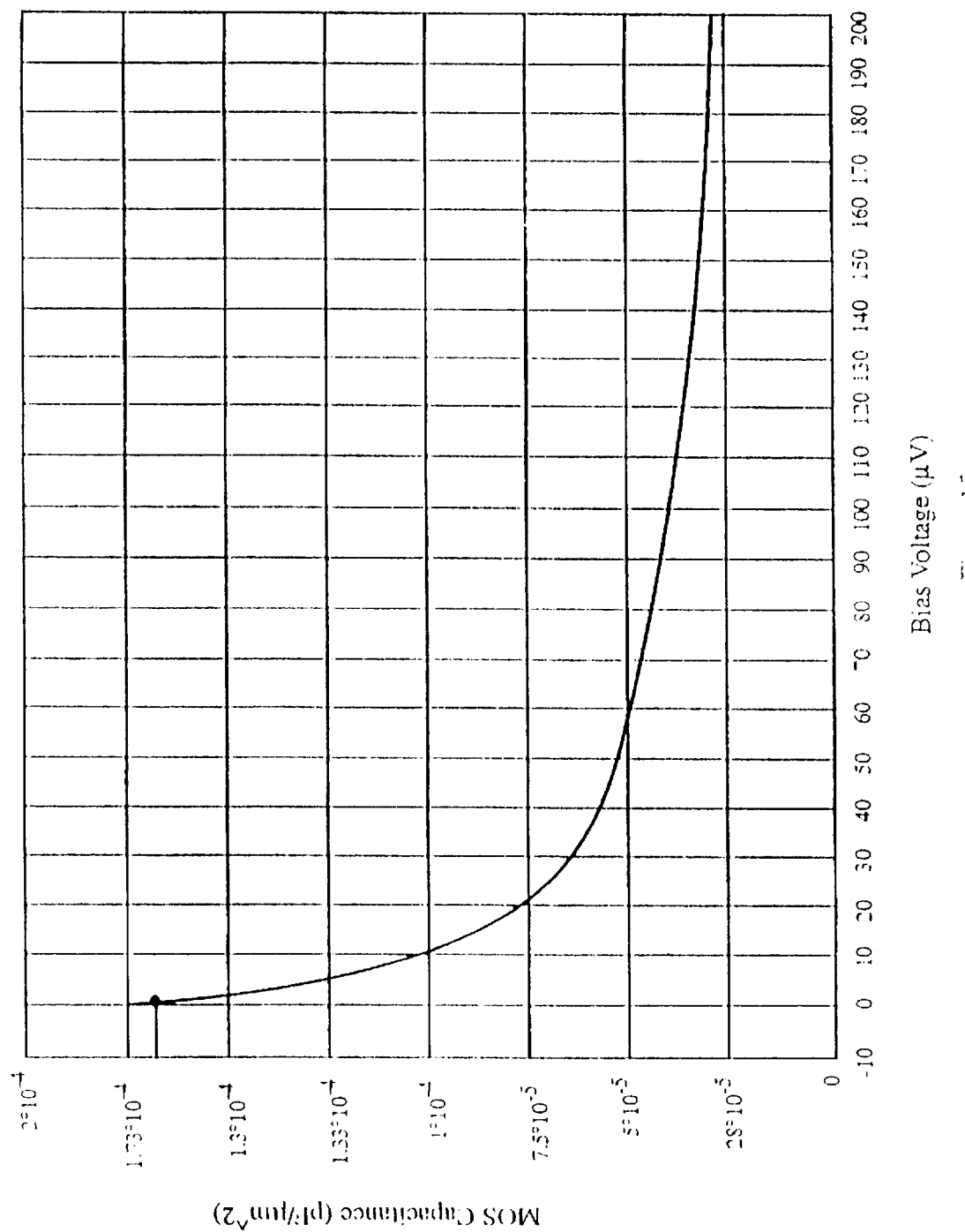
FIG. 15 shows the plot of MOS capacitance versus bias voltage.

Frequency tuning is achieved by altering the electrical length of the microstrip antenna with the aid of a MOS capacitor 85 since MOS capacitance is voltage dependent. FIG. 15 shows the voltage dependent MOS capacitance as MOS capacitance versus bias voltage. The MOS capacitance is comparable with the open end capacitance of the microstrip antenna (about 5 e–5 pF). assuming a substrate resistivity of approximately 250 Ohm-cm, the MOS capacitance at zero bias is approximately 1.6 e–4 pF per square micron. Therefore, one needs about one square micron for the surface of the MOS capacitor (see FIG. 9 at 85).

Figure 16:
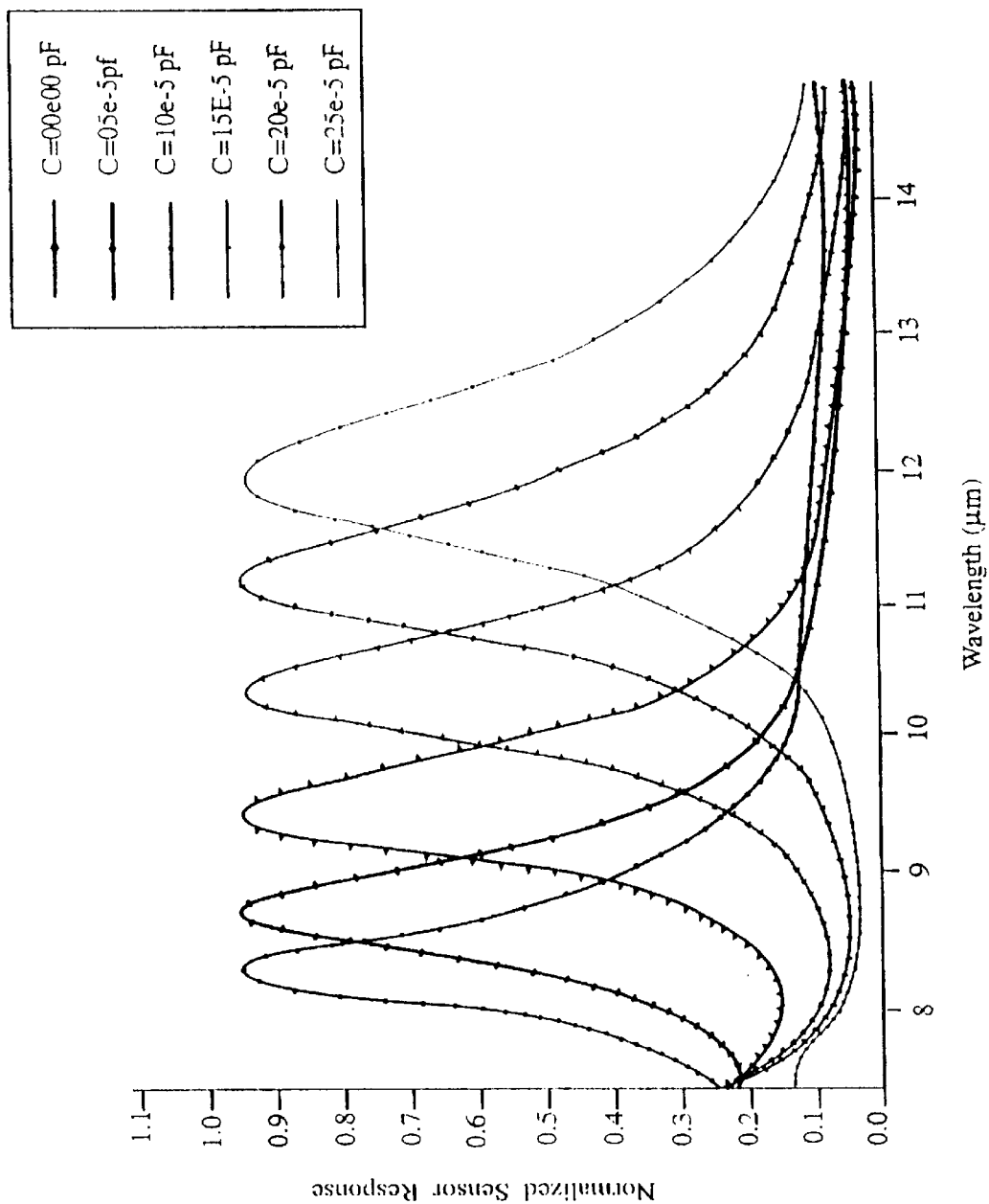
FIG. 16 shows of sensor responses versus incident wavelength for various imposed capacitances.

FIG. 16 shows the predicted approximately 8 um to approximately 12 micrometers wavelength tuning of the above embodiment wherein there is shown the normalized sensor response as a function of the wavelength. This behavior is predicted using a commercial method of moments simulation package (IE3D from Zeeland Sotware, Inc.). To cover the entire 8–12 micrometers range, the capacitance needs to be increased by a factor of five. An examination of FIG. 15, indicates that such a capacitance change seems to be achievable.

Frequency tuning of a microstrip antenna for capture of an approximately 8 um to approximately 12 um wavelength radiation is realized utilizing capacitance change in response to bias voltage change of a MOS capacitor. The detector for IR radiation can be a niobium bolometer connected between the patch antenna and the ground plane of the device.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An Infrared(IR) detector antenna unit for detecting IR radiation that is compact with no-moving parts, comprising:
   an infrared(IR) sensor for receiving IR radiation;
   an antenna coupled to and extending from the sensor whereby electromagnetic radiation incident on said sensor induces infrared-frequency current waves to flow in said antenna; and
   a tuning device integrated onto the antenna wherein the IR detector antenna unit has enhanced feature extraction, discrimination and clutter removal.

2. The IR detector antenna unit of claim 1 wherein the antenna includes:
   a microstrip coupled to a bolometer sensor.

3. The IR detector antenna unit of claim 2, wherein the device includes:
   a resonant frequency response of approximately 8 micrometers to approximately 12 micrometers region of the infrared radiation.

4. The IR detector antenna unit of claim 2, wherein the tuning device includes:
   a MOS(Metal Oxide Semiconductor) for altering the electrical length of the microstrip to achieve frequency tuning of the antenna unit.

5. The IR detector antenna unit of claim 1, wherein the device includes:
   a resonant frequency response of approximately 8 mircrometers to approximately 12 micrometers wavelenght region of the infrared radiation.

6. The IR detector antenna unit of claim 1, wherein the antenna unit includes:
   dimensions of approximately 2 micrometers to approximately 3 micrometers on each side.

7. An IR(Infrared) detector antenna sensor comprising:
   a microstrip antenna; and
   a bolometer coupled to the microstrip antenna, wherein the sensor has a tunable response accomplished by use of a single substrate voltage on a separate capacitative device on the antenna.

8. The IR antenna sensor of claim 7, wherein the separate capacitative device includes:
   a MOS(Metal Oxide Semiconductor).

9. The IR detector antenna sensor of claim 8, wherein the separate capacitative device includes:
   a resonant frequency response of approximately 8 micrometers to approximately 12 micrometers wavelength region of the infrared radiation.

10. The IR detector antenna sensor of claim 7, wherein the separate capacitative device includes:
    a resonant frequency response of approximately 8 micrometers to approximately 12 micrometers wavelength region of the infrared radiation.

* * * * *

UNITED STATES PATENT AND TRADEMARK OFFICE
CERTIFICATE OF CORRECTION

PATENT NO. : 6,310,346 B1
DATED : October 30, 2001
INVENTOR(S) : Boreman et al.

It is certified that error appears in the above-identified patent and that said Letters Patent is hereby corrected as shown below:

Title page,
Item [57], ABSTRACT, Lines 5-16, should read:

-- This invention relates to infrared detectors, and in particular to an antenna, which includes a device coupled directly to the antenna feed which allows tuning of the collected infrared radiation onto an infrared detector sensor, and is a Continuation-In-Part of U.S. Application Ser. No. 09/004,132 entitled: Polarization-Tunable Antenna-Coupled Infrared Detector, filed on Jan. 7, 1998 now U.S. Pat. No. 6,037,590 issued on Mar. 14, 2000, which claims the benefit of priority to U.S. Provisional Application No. 60/048,334 filed May 30, 1997, and this invention was made with Government support under N66001-98-D-6003 awarded by Space and Naval Warfare Systems Center, San Diego. The Government has certain rights in this invention, --

Signed and Sealed this

Twelfth Day of October, 2004

JON W. DUDAS
*Director of the United States Patent and Trademark Office*